United States Patent [19]

Sumitani et al.

[11] 4,321,344

[45] Mar. 23, 1982

[54] CONTINUOUS BULK POLYMERIZATION OF THERMOPLASTIC RESINS

[75] Inventors: Tomoaki Sumitani; Yasunori Masaki; Tokinobu Furukawa; Yukio Inoue; Chikao Oda, all of Kudamatsu, Japan

[73] Assignee: Hitachi, Ltd., Tokyo, Japan

[21] Appl. No.: 202,326

[22] Filed: Oct. 30, 1980

[30] Foreign Application Priority Data

Nov. 2, 1979 [JP] Japan .................................. 54-141348

[51] Int. Cl.³ ................................................ C08F 2/02
[52] U.S. Cl. ...................................... 526/64; 526/920
[58] Field of Search ................................... 526/64, 920

[56] References Cited

U.S. PATENT DOCUMENTS 3,513,145  5/1970  Crawford ........................... 260/93.5

FOREIGN PATENT DOCUMENTS 42-3394    2/1967  Japan.
47-610     1/1972  Japan.
49-107395 10/1974  Japan.
52-22973   6/1977  Japan.
53-46871  12/1978  Japan.

OTHER PUBLICATIONS

Kaguka Kogaku, 33, No. 7, pp. 608-613 (1969).

Primary Examiner—Stanford M. Levin
Attorney, Agent, or Firm—Craig and Antonelli

[57] ABSTRACT

Continuous bulk polymerization of thermoplastic resins is carried out by using a horizontal continuous polymerizer comprising a cylindrical body, one or more shafts having the stirring elements and disposed in said body, a material inlet provided at an end of said body in its longitudinal direction, and a material drawing means and an outlet provided at the other end of said body. A monomer is evaporated from a polymerization solution while controlling the pressure in said polymerizer at a predetermined level and, concurrently with this, a monomer is directly sprayed to the free surface of the polymerization solution in the polymerizer from several locations of said polymerizer in its longitudinal direction, whereby to eliminate the heat of polymerization reaction and the heat of stirring to allow progress of the polymerization reaction under a predetermined temperature condition.

5 Claims, 4 Drawing Figures

CONTINUOUS BULK POLYMERIZATION OF THERMOPLASTIC RESINS

BACKGROUND OF THE INVENTION

I. Field of the Invention

This invention relates to a method for continuous bulk polymerization of thermoplastic resins, more particularly a continuous bulk polymerization method capable of continuously producing polystyrene resins by bulk polymerization.

II. Description of the Prior Art

It is generally known that the higher the average molecular weight or the narrower the molecular weight distribution of polystyrene resins, the more excellent are the mechanical properties such as tensile strength and impact resistance, transparency and processability. On the other hand, since the polymerization degree is dependent on the polymerization temperature alone, it is desirable to perform the polymerization at a constant temperature as much as possible for obtaining a high-quality product, and thus, in such polymerization, temperature control becomes an important problem. In other words, it is required in this type of polymerization to remove the heat of reaction that is generated during the polymerization. However, in the case of polystyrene resins, the viscosity of the polymerized product rises up excessively as the polymerization advances, and this causes a drop of the coefficient of heat transfer and makes it difficult to remove the heat of reaction. Therefore, in the various techniques hitherto developed for continuous bulk polymerization of polystyrene resins, most of the efforts have been directed to removal of said heat of reaction.

Among typical examples of heretofore industrially employed continuous bulk polymerization methods for polystyrene resins, there is a multi-stage stirring tank (or zone) type polymerization method such as shown in Japanese Patent Appln Kokoku (Post-Exam Publn) No. 610/72. According to this method, the polymerization is carried out in a series (3 to 5) of vertical stirring tanks by using toluene or the like as solvent. The first-stage stirring tank is of an ordinary turbine blade type, while a helical screw type having an internal cooling coil is employed for the second and succeeding stages stirring tanks in which heat removal from the highly viscous polymerized product is required. In other known polymerization methods using similar stirring tanks proposed, for example, in Japanese Patent Appln Kokoku (Post-Exam Publn) No. 3394/67 and U.S. Pat. No. 3,513,145, a scraper is provided at the end of each stirring blade for elevating the coefficient of heat transfer on the internal wall of the stirring tank.

According to such stirring tank type polymerization methods, it is possible to obtain products with a narrow range of molecular weight distribution by substantially equalizing the polymerization temperatures in the respective tanks in case the polymer viscosity is of a low level, but when the polymer viscosity is high, the coefficient of heat transfer drops excessively and particularly in the case of the scraper type, a high power is required for rotating the stirring blades and the amount of heat removed thereby becomes insufficient owing to an increased amount of stirring heat. In the case of the helical screw type, there may occur corotation of the stirring blades and the polymerized product when the latter is of a high viscosity. Therefore, in said stirring tank type polymerization method, the polymerization must be carried out by controlling the conversion to a low range or by adding a solvent such as toluene for keeping the polymer viscosity at a low level. This results in an increased load for the solvent or monomer recovery.

Also, in said stirring tank type method, when it is desired to enlarge the system scale, since the heat transfer area increases only in $\frac{2}{3}$ power against an increase of the amount of the material to be treated therein in similar scale expansion, there takes place an insufficient heat removing area, which results in making a certain limitation to the possible expansion of the scale. Any attempts to make up for such limitations lead to complication of the apparatus and raising of production cost.

For increasing the heat removing capacity in the polymerization method using the stirring tanks, it is conceivable to enlarge the temperature difference between the contents of the tank and the cooling medium, but in this case since the temperature of the polymerized product near the heat-transferring wall surface drops to raise the viscosity, it becomes difficult to accomplish renewal of the wall surface by stirring. Thus, this leads to a drop of the coefficient of heat transfer, and there is a limitation in increase of the heat removing capacity by enlargement of temperature difference between the contents and the cooling medium, and also there arises a difference in temperature distribution between the inside of the tank and the section near the heat transfer surface, which results in broadening the width of molecular weight distribution of the polymerization product.

Among other proposed methods for continuous bulk polymerization of polystyrene resins, there is a method using a tower type or flighted screw type polymerizer. However, in the case of the tower type polymerizer, it is not easy to accomplish uniform heat removal of the contents and it is also difficult to provide the polymerizer with an allowance for its heat removing capacity. Further, there often takes place a runaway reaction and scaling may occur over the entire tower. On the other hand, the flighted screw type polymerizer is smaller in holdup and shorter in residence time than the devices of other types, so that the throughput per apparatus cost is low and difficulties are present in practical use of the device.

In any of the above-said methods, the polymerized products are cooled indirectly by a cooling medium through heat transfer walls such as coil or jacket. Problems of these methods reside in the small coefficient of heat transfer due to a high viscosity of the polymerized product and no allowance for heat removing capacity.

In contrast, there are also known a method in which a polymerized product is placed under reduced pressure and unreacted monomer or solvent is evaporated away from the polymer so that the heat of reaction is removed by the latent heat of evaporation, a direct cooling method in which a monomer, solvent or non-solvent is directly sprayed over the free surface of the polymer produced, and the like. These methods can provide a high heat removing capacity and also allows easy temperature control as the polymer produced is cooled directly by the latent heat of evaporation. However, these methods, when used singly, have both merits and demerits.

In the case of the method in which the monomer is evaporated away from the polymer produced and the reaction temperature is controlled by the latent heat of evaporation, the evaporated matter recovery system is simplified but in case of applying this method to a horizontal flow type polymerizer, there is produced a temperature difference at the flow direction of the polymer produced in the polymerizer due to the elevation of boiling point resulted from the rise of the conversion, so that it is impossible to perform the polymerization at a perfectly constant temperature. Also, when this method is applied to vertical perfect mixing type stirring tanks, there occurs an excessive drop of volumetric efficiency due to an increase of apparent volume of the polymer produced by foaming.

In the case of the method in which a solvent or non-solvent is directly sprayed over the free surface of the polymer, the cost for the recovery system increases and physical properties, transparency, etc., of the product are also affected badly by such solvent or non-solvent unless it is perfectly removed in the final step of polymerization. Further, this method is limited in its effect unless there is used an apparatus which has high surface renewal effect and is almost perfectly free of dead space, and since this method is essentially of the type designed to effect local cooling of the free surface alone of the polymer, there is a limitation to the enlargement of the apparatus.

The polymerization methods proposed in Japanese Patent Appln Kokai (Laid-Open) NO. 107395/74 and Japanese Patent Appln Kokoku (Post-Exam Publn) Nos. 22973/77 and 46871/78 are of the type in which a non-solvent with a lower boiling point than the polymerization solution, monomer and solvent is sprayed directly over the free surface of the polymerization solution and the heat of reaction is removed by the latent heat of evaporation. Thus, these methods are capable of producing a higher heat removing effect than the indirect cooling methods using a coil, jacket or other like means. According to these methods, however, since heat exchange between the polymerization solution and the non-solvent applied for the purpose of temperature control is effected only on the free surface of the polymerization solution, the polymerization reaction apparatus used for such methods must be one which has an extremely high surface renewal effect and is also almost perfectly free of dead space as mentioned above, so that these methods are subject to a certain limit in the amount of heat removable.

The above-said three inventions propose the use of a multiple-disc type horizontal stirring tank such as shown in FIG. 1 as polymerization reactor, but when said type of method is used for continuous treatment of a polymer produced with a high viscosity of over about 3,000 poises, the following problems arise. Referring to FIG. 1, there is shown a partial sectional view of a multiple-disc type two-shaft horizontal stirrer comprising a horizontally laid cylindrical stirrer body 1 which is partitioned along the longitudinal direction by weirs 2 into several sections (tanks), with two parallel shafts 3 extending through the body 1. Each of said shafts 3 is provided with a plurality of disc-shaped stirring blades 4 arranged such that the blades on one shaft are in staggered relation with those on the other shaft, whereby the material supplied thereinto is forced to flow from left to right in the drawing under stirring in accordance with rotation of the shafts 3. An inlet nozzle 5 is provided at the lower left end of the stirrer body 1 and a drawing screw 6 and an outlet nozzle 7 are provided at the lower right ends of the stirrer body 1.

The material to be polymerized (intermediate polymerization product) is supplied into the stirrer body 1 from the inlet nozzle 5, polymerized while stirred by the stirring blades 4 in the stirring body 1, passed through the drawing screw 6 and withdrawn from the outlet nozzle 7 as the final polymerization product. Removal of the heat of polymerization and stirring heat in the body 1 is accomplished either by indirect cooling with a jacket (not shown) surrounding the body 1 or by direct cooling with a non-solvent coolant circulation system having an external cooling means.

A problem involved in the polymerization method using said multiple-disc type horizontal stirrer is that the dead spaces are formed at the spaces with small stirring effect (the portions indicated by the mark × in the drawing) because the disc-shaped stirring blades 4 on the two shafts 3 are arranged alternately with each other as shown in FIG. 1, and when the material stagnates in these dead spaces, the surface renewal is hindered and also the residence time of the material is prolonged, which causes deterioration of the quality of the product. Also, when it is tried to continuously polymerize a material with a high viscosity of over about 3,000 poises according to this method, the material stagnating in said dead spaces is gelled to make the continuous treatment difficult.

When the heat removal from such a high-viscosity material is performed by direct cooling through the non-solvent coolant circulation with an external cooler means as proposed in Japanese Patent Appln Kokai (Laid-Open) No. 107395/74, the concentration of the coolant such as water becomes higher than that of the material (polystyrene series resin) with the result that the material comes to rise up more than the coolant at the upper portion of the drawing screw 6, resulting in unstable ingress of the material into the drawing screw 6 to make it difficult to carry out the continuous drawing operation.

As explained above, the conventional methods have various problems, and particularly in case of using such methods for bulk polymerization of polystyrene resins with high viscosity of over 3,000 poises, it is found difficult to perform a stabilized continuous treatment. There is also proposed a method in which the polymerization is carried out by lowering a viscosity of the contents (polymerized material) to be treated by elevating the polymerization temperature, but in this case, as described in "Kagaku Kogyo (Chemical Engineering)" Vol. 33, No. 7, 608–613 (1969), the average molecular weight of the product is low and no high-quality product is obtained.

SUMMARY OF THE INVENTION

In view of the above, the present invention has for its object to provide a method for continuous bulk polymerization of thermoplastic resins, which method enables continuous bulk polymerization at a constant temperature even under a high viscosity condition and is capable of producing a high-quality thermoplastic resin having a large molecular weight and narrow molecular weight distribution.

This invention provides a method for carrying out continuous bulk polymerization of thermoplastic resins by using a horizontal continuous polymerizer having in its cylindrical body one or more revolving shafts fixed with stirring elements and also provided with a material inlet at an end of said body along its longitudinal direction and a material drawing apparatus and an outlet at the other end, characterized in that a monomer is evaporated from a polymerization solution while controlling the pressure in the polymerizer at a predetermined level and, concurrently with this, a controlled amount of monomer is sprayed from each of a plurality of monomer spray nozzles provided along the longitudinal direction of the polymerizer and evaporated so that the heat of polymerization reaction and the heat of stirring are removed by the latent heat of evaporation of the monomer which evaporates from said polymerization solution and by the sensible heat and the latent heat of evaporation of the monomer sprayed from said spray nozzles, thereby allowing the progress of the polymerization reaction always under a predetermined temperature condition.

DESCRIPTION OF THE PREFERRED EMBODIMENT

Figure 2:
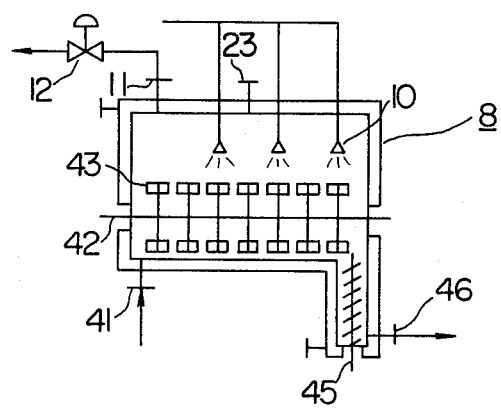
FIG. 2 is a drawing showing an example of the polystyrene resin production process for illustrating an embodiment of the method of this invention.
Figure 3:
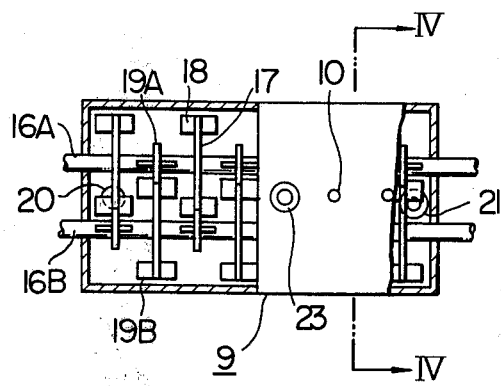
FIG. 3 is a plane view, partly shown in section, of a two-shaft 8-shaped mixer which constitutes a principal part of the structure of FIG. 2.
Figure 4:
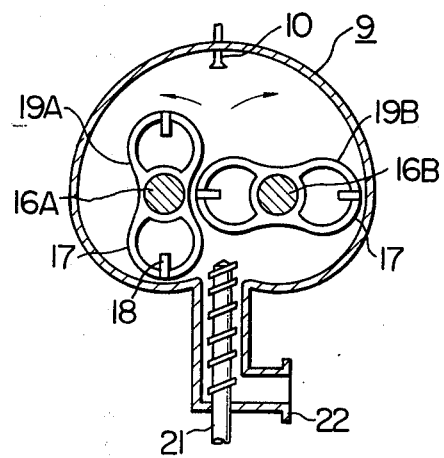
FIG. 4 is a sectional view taken along the line IV—IV of FIG. 3.

Now, the method of this invention is described in detail by way of an embodiment thereof with reference to FIGS. 2 to 4 of the accompanying drawings.

FIG. 2 is a schematic illustration showing an example of the polystyrene resin production process used in this invention. In FIG. 2, reference numeral 8 designates a horizontal continuous polymerizer of a structure comprising a two-shaft 8-shaped mixer 9 shown in FIG. 3, a plurality of monomer spray nozzles 10, an evaporated matter outlet nozzle 11 and a pressure regulating valve 12. The material to be polymerized (an intermediate polymerization product or prepolymer of polystyrene series resin) is introduced into the polymerizer 8 from an inlet nozzle 41 and stirred and mixed by the stirring elements 43 with rotation of the shaft 42 to carry out the polymerization reaction. The pressure in the polymerizer 8 is adjusted by the pressure regulating valve 12 such that the boiling point of the polymerization solution will coincide with the intended polymerization temperature. There consequently takes place internal evaporation of the monomer in the polymerization solution and hence the polymerization solution temperature does not rise up above the boiling point of the polymerization solution but is kept constant. This operation can be easily accomplished in the actual practice by detecting the temperature of the polymerization solution and automatically adjusting the pressure regulating valve 12 in correspondence to the deviation from the target temperature. However, if the polymerization solution temperature is adjusted only by means of internal evaporation of the monomer, there is produced a temperature distribution (temperature difference) along the longitudinal direction of the polymerizer 8 from the inlet toward the outlet due to rise of the boiling point of the polymerization solution with the progress of the polymerization. Also, when the conversion (polymerization percent) is relatively low, there readily occurs evaporation of the monomer of an amount sufficient to get rid of the heat of polymerization reaction and stirring heat (both the heat of polymerization reaction and stirring heat are taken away as the latent heat of evaporation of the monomer), but in the region where the conversion is high, the heat of stirring increases sharply with the rise of viscosity while the amount of evaporation of the monomer decreases because of decrease of the absolute amount of the monomer, with the result that it becomes impossible to remove the whole amount of heat generated only by evaporation of the monomer.

In view of this, this invention is characterized in that the heat removal can be accomplished not only by internal evaporation of the monomer but also by direct spray of the monomer from the spray nozzles 10 over the free surface of the polymerization solution in the polymerizer 8. The sprayed monomer (hereinafter referred to as "spray monomer"), upon contacting the free surface of the polymerization solution, immediately reaches the boiling point and is evaporated to deprive the polymerization solution of the latent heat of evaporation. In this case, since direct heat exchange is performed between the spray monomer and the polymerization solution, there is provided far higher heat transfer efficiency than obtainable from conventional indirect cooling by a coolant through a heat transfer wall as far as sufficient stirring of the polymerization solution and its surface renewal are ensured. Also, in this invention, since said heat removal by spray monomer is effected concurrently with cooling by internal evaporation of the monomer from the polymerization solution, heat removal by monomer spray needs to be performed only to such an extent as to cancel out the increment of temperature resulting from the rise of the boiling point of the polymerization solution with the progress of the polymerization. Therefore, it suffices to spray a regulated amount of monomer from each of the monomer spray nozzles 10, whereby it is possible to easily maintain constant the temperature of the polymerization solution in the polymerizer 8. The number of the monomer spray nozzles 10 is preferably 2 or more and the more precise control becomes possible, the more the number of monomer spray nozzles becomes.

As means for direct cooling of the polymerization solution by a coolant, there is known a method using a non-solvent (such as water) other than the monomers or a solvent other than the monomers (Japanese Patent Appln Kokai (Laid-Open) No. 107395/74 and Japanese Patent Appln Kokoku (Post-Exam Publn) No. 22973/77), but in case of using a third substance as in this method, such a third substance may remain in the final product to affect the product quality. Also, an operation for separating the monomer and said third substance is required in the evaporated matter recovery system, resulting in an elevated cost for recovery. Such problem is eliminated according to the method of this invention. Further, in case of using said conventional direct cooling method, it is essential to employ a polymerizer of the type which can provide a sufficient stirring and mixing action as well as a sufficient surface renewing action and which forms no dead space in the apparatus because otherwise the polymerization solution in the polymerizer may be overcooled partially while causing insufficient heat removal in other parts, thus giving rise to a temperature distribution in the polymerization solution to make it unable to obtain a high-quality product, and in some cases, local gelation may take place. This is not foreign to the method of this invention.

Therefore, in this invention, in order to allow effective accomplishment of the heat removing operations, there is preferably used, for example, a mixer having two shafts and in the shape of figure 8 (two-shaft 8-shaped mixer), such as shown in FIG. 3, which has an excellent stirring and mixing performance and is capable of giving a high surface renewal effect on the material and also highly proof against formation of dead spaces in the apparatus.

FIG. 3 is a plane view, partly shown in section, of said two-shaft 8-shaped mixer, and FIG. 4 is a sectional view taken along the line IV—IV of FIG. 3. As shown in these drawings, the mixer comprises a body portion 9 provided therearound with a heating and cooling means (usually a jacket heating and cooling means, not shown in the drawings), and there are provided in said body portion 9 a pair of shafts 16A, 16B, a plurality of 8-shaped stirring elements 19A, 19B each of which consists of an annular support plate 17 and scraper blades 18, an inlet nozzle 20 for the solution to be treated, a drawing screw 21, a material outlet 22, and a volatiles discharge nozzle 23. Said shafts 16A, 16B are provided horizontally along the longitudinal direction of the mixer body portion 9 as shown, and the annular support plates 17 are secured to said respective shafts 16A, 16B such that they are arranged symmetrical to each other in the direction vertical to said shafts. At both ends of each of said annular support plates 17 are provided the scraper blades 18. Said support plate 17 and two scraper blades 18 constitute an 8-shaped stirring element 19A, 19B. Said stirring elements 19A, 19B are provided in plurality in opposed relation to each other with a phase angle of 90° from one another. Also, said shafts 16A, 16B are so positioned that the ends of the respective stirring elements 19A, 19B will pass in close adjacency to the corresponding shafts 16B, 16A.

Being constructed as described above, the two-shaft 8-shaped mixer 9 operates as follows. The material to be treated (intermediate polymerization product) is supplied into the mixer from the inlet nozzle 20 and successively moved toward the outlet while undergoing stirring and surface renewal by the stirring elements 19A, 19B with rotation of the shafts 16A, 16B which rotate in the opposite directions to each other from the inside toward the outside of the mixer 9 as shown by arrows in FIG. 4, whereby the material is polymerized while performing evaporation of the monomer to give a high polymer (or final polymerization product) and taken out from the outlet nozzle 22. The volatiles including the monomer liberated in the mixer 9 are discharged out from the discharge nozzle 23. According to this invention, the space between the 8-shaped stirring elements 19A, 19B, that is, the space between the adjoining scraper blades 18 in the axial direction of the shafts 16A, 16B is extremely small and also the stirring elements 19A, 19B rotate with their ends (that is, scraper blades 18) coming close to the corresponding shafts 16B, 16A, so that the material adhering to the inner surface of the mixer 9 and around the shafts 16A, 16B is scraped out by the scraper blades 18 to inhibit formation of any dead space on the inner wall surface of the mixer 9 or around the revolving shafts 16A, 16B. Further, since each of the stirring elements 19A, 19B is constructed from the annular support plate 17 secured to the corresponding shaft (16A or 16B) vertically thereto and the scraper blades 18 provided at the ends of each said support plate 17 vertically to said corresponding shaft, the material is effectively stirred and mixed by the scraper blades 18 when they pass through the material in the lower half portion of the mixer 9, and when said blades pass the space above the material, the material adheres to the annular portion of each support plate 17 to form a free surface to enlarge the evaporation surface area of the material while performing effective surface renewal of the material.

Figure 1:
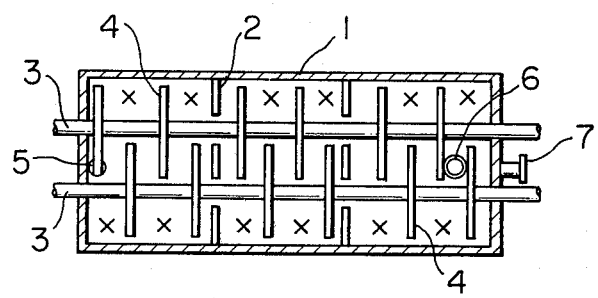
FIG. 1 is a schematic illustration of the inside structure of a conventional multiple-disc type two-shaft horizontal stirrer.

Having the above-described construction and function, the two-shaft 8-shaped mixer 9 is capable of eliminating the dead spaces which have been inevitably formed, as shown by X marks, in the conventional multiple-disc type two-shaft stirrers shown in FIG. 1, and is also capable of continuous polymerization of the material with a high viscosity of over 3,000 and up to 40,000 poises as well as continuous removal of volatiles, which has been impossible in the conventional devices. Thus, the two-shaft 8-shaped mixer 9 of this invention has the merits in that the formation of dead space is lessened remarkably and the surface renewal function is expedited.

The method of this invention can be applied to production of thermoplastic resins such as styrene series polymers, e.g. polystyrene, AS (acrylonitrile-styrene) resin, ABS (acrylonitrile-butadiene-styrene) resin, etc.; polyolefins, e.g. polyethylene, etc.; polydiolefins, e.g. polybutadiene, etc.; and others which can be produced by bulk polymerization.

For example, in the case of continuous bulk polymerization of styrene using the polymerizer as shown in FIG. 3, the polymerization can be conducted under the following conditions:

Supplying amount of intermediate polymerization product: 9 kg/hour
Polymerization temperature: 130° C.
Residence time: 5 hours
Pressure in the polymerizer: 300–400 torr
Supplying amount of monomer for removing the heat: 1.06 kg/hour
Condensed amount of monomer evaporated: 2.69 kg/hour
Polymerization percent of styrene at inlet: 48%
Polymerization percent of styrene at outlet: 82%

That is, an intermediate polymerization product previously polymerized at 130° C. to polymerization percent (conversion) of 48% in a vertical type stirring tank is used as a starting material. The temperature in the polymerizer can be maintained at 130° C.±2° C. by controlling the pressure of the polymerizer and supplying amount the monomer. The resulting polymer has a weight-average molecular weight of about 300,000, which is almost the same value as expected from the polymerization temperature.

In the case of styrene, the polymerization temperature of 130° to 170° C. may be employed but in the case of other monomers, the polymerization temperature varies depending on the kinds of monomers employed.

As described above, according to this invention, the monomer is internally evaporated from the polymer in the horizontal continuous polymerizer with its internal pressure controlled and, in addition to this, the monomer is applied from the outside to the free surface of the polymer so that the applied monomer is evaporated from the free surface of the polymer, whereby the heat of polymerization and the heat of stirring are removed by the latent heat of evaporation. It is thus possible with this invention to carry out continuous bulk polymerization at a constant temperature even under a high viscosity condition and to obtain a high-quality thermoplastic resin having a high average molecular weight and a narrow range of molecular weight distribution.

What is claimed is:

1. A method for conducting continuous bulk polymerization of a thermoplastic resin which comprises:

using a horizontal continuous polymerizer comprising a cylindrical body, one or more shafts having a plurality of stirring elements and disposed in said body, a material inlet provided at an end of said body, a material drawing means and an outlet provided at the other end of said body, introducing an intermediate polymerization product of an unsaturated monomer capable of producing resin by bulk polymerization into said material inlet, controlling the pressure in the polymerizer at a prescribed level, and evaporating unsaturated monomer from a polymerization solution in said polymerizer under said pressure conditions, and spraying a controlled amount of unsaturated monomer from a plurality of monomer spray nozzles provided along the longitudinal direction of the polymerizer onto a surface of polymerization solution therein and evaporating said monomer, whereby the polymerization is carried out at a constant prescribed temperature by removing the heat of polymerization reaction and heat of stirring by means of the latent heat of evaporation of the monomer evaporated and the sensible heat and the latent heat of evaporation of the monomer sprayed from said spray nozzles.

2. A method for conducting continuous bulk polymerization of a thermoplastic resin according to claim 1, wherein the horizontal continuous polymerizer has two rotating shafts having a plurality of stirring elements and disposed in parallel in the cylindrical body along the longitudinal direction, each stirring element being constructed from an annular support plate in the form of the figure 8 symmetrical with respect to its center in which each rotating shaft is placed perpendicular to the annular support plate and a pair of scraper blades fixed at both ends of the annular support plate, and individual stirring elements fixed on individual corresponding positions on individual rotating shafts being arranged with a phase angle of about 90° from each other.

3. A method for conducting continuous bulk polymerization of a thermoplastic resin according to claim 1, wherein the thermoplastic resin is polystyrene.

4. A method for conducting continuous bulk polymerization of a thermoplastic resin according to claim 1, wherein an intermediate polymerization product of styrene is charged from the material inlet and a styrene monomer is sprayed from a plurality of monomer spray nozzles.

5. A method for conducting continuous bulk polymerization of a thermoplastic resin according to claim 1, wherein the resin produced by bulk polymerization comprises polystyrene, acrylonitrile-styrene resin, acrylonitrile-butadiene-styrene resin, polyolefin or polydiolefin.

* * * * *